US007310214B2

(12) United States Patent  (10) Patent No.: US 7,310,214 B2
Luu  (45) Date of Patent: Dec. 18, 2007

(54) INDUCTIVE OUTPUT TUBE (IOT) CONTROL CIRCUIT

(75) Inventor: Ky Thoai Luu, Mason, OH (US)

(73) Assignee: Harris Corporation, Melbourne, FL (US)

( * ) Notice: Subject to any disclaimer, the term of this patent is extended or adjusted under 35 U.S.C. 154(b) by 448 days.

(21) Appl. No.: 10/854,968

(22) Filed: May 27, 2004

(65) Prior Publication Data

US 2005/0265054 A1 Dec. 1, 2005

(51) Int. Cl.
*H02H 9/00* (2006.01)
(52) U.S. Cl. .................... 361/119; 361/91.1
(58) Field of Classification Search ............... 361/119, 361/91.1
See application file for complete search history.

(56) References Cited

U.S. PATENT DOCUMENTS

| 5,140,229 | A |   | 8/1992 | Yagi et al. ............... 315/307 |
| 5,739,643 | A |   | 4/1998 | Usui ....................... 315/241 S |
| 5,903,110 | A |   | 5/1999 | Pol et al. .................. 315/307 |
| 5,910,709 | A |   | 6/1999 | Stevanovic et al. ......... 315/225 |
| 6,194,842 | B1 |   | 2/2001 | Canova ..................... 315/225 |
| 6,272,030 | B1 | * | 8/2001 | Oomura ..................... 363/62 |
| 6,452,343 | B2 |   | 9/2002 | Oostvogels et al. .... 315/209 R |
| 6,724,153 | B2 |   | 4/2004 | See et al. .............. 315/209 R |

OTHER PUBLICATIONS

Harris BT-30U UHF Color Television Transmitter Technical manual a) Front cover of BT-30U UHF Color Television Transmitter Technical manual b) Selection of BT-30U Technical manual . . . General Description Circuit Description of primary power through Breakers, Contactor and power supply. Description of protection power through Breakers, Contactor and power supply. Description of protection circuits for over current. c) Selection of BT-30U Technical manual. Detailed Description Circuit description of primary power through breakers, relays, transformer, rectifier, L and C filter. Description of current overload circuits and removal of AC power via switch/relay. d) Fig. 7.3 of BT-30U Technical manual. Schematic showing switch, transformer, rectifier, filter, overload sensor and tube. e) Block Diagram of BT-30U Technical manual. Block Diagram showing switch, HV Power supply, current sensor and tube. f) Archived original document of Block diagram in 1e showing date of 1971.

(Continued)

*Primary Examiner*—Stephen W. Jackson
(74) *Attorney, Agent, or Firm*—Tarolli, Sundheim, Covell & Tummino LLP

(57) ABSTRACT

A power supply for an RF transmitting tube while protecting the tube from a high voltage arc event. The supply includes a rectifier circuit configured to be connected to an AC voltage supply and having an output circuit that supplies a DC voltage to a load including the tube and wherein the DC voltage may have a ripple voltage thereon. A control circuit is located intermediate the output circuit and the load for reducing any ripple voltage. The control circuit includes a series solid state switch that is connected in series between the rectifier circuit and the load. The control circuit also includes a reference capacitor coupled to the output circuit and to the load for supplying a reference voltage to the switch so that a voltage at the output circuit that exceeds the reference voltage will be clipped to reduce the voltage that is applied to the load.

11 Claims, 5 Drawing Sheets

OTHER PUBLICATIONS g) Archived original document of schematic diagram in 1d showing date of 1975. h) Data sheet of Jennings vacuum contactor (high speed switch). i) Instruction manual of HV Power Supply. 1) Description of Filter with current limit. 2) Circuit Description of HV Power Supply stating that designer is not bounded in the selection of inductor or capacitor value. 3) Discussion of operation into a load with short circuit. 4) Discussion of series resistor to limit current. 5) Schematic of filter showing one possible configuration of Inductor, Capacitor and Resistor.

Maintaining Electronic Systems, by Jerry C. Whitaker, copyright 1991 by Multiscience Press, Inc., pages: cover sheet, second sheet and 281-325, all labeled as pp. 2-15.

Power Vacuum Tubes, by Jerry Whitaker, copyright 1994 by Multiscience Press, including cover sheet and first and second sheets and pp. 201-214, 301-307, all labeled as pp. 16-39; and.

Television Transmitters, By A. Hans Bott in National Association of Broadcasters, Engineering Handbook, Sixth Edition, copyright 1975 by the National Association of Broadcasters, Chapter 19, pp. 475-540, plus two cover pages.

* cited by examiner

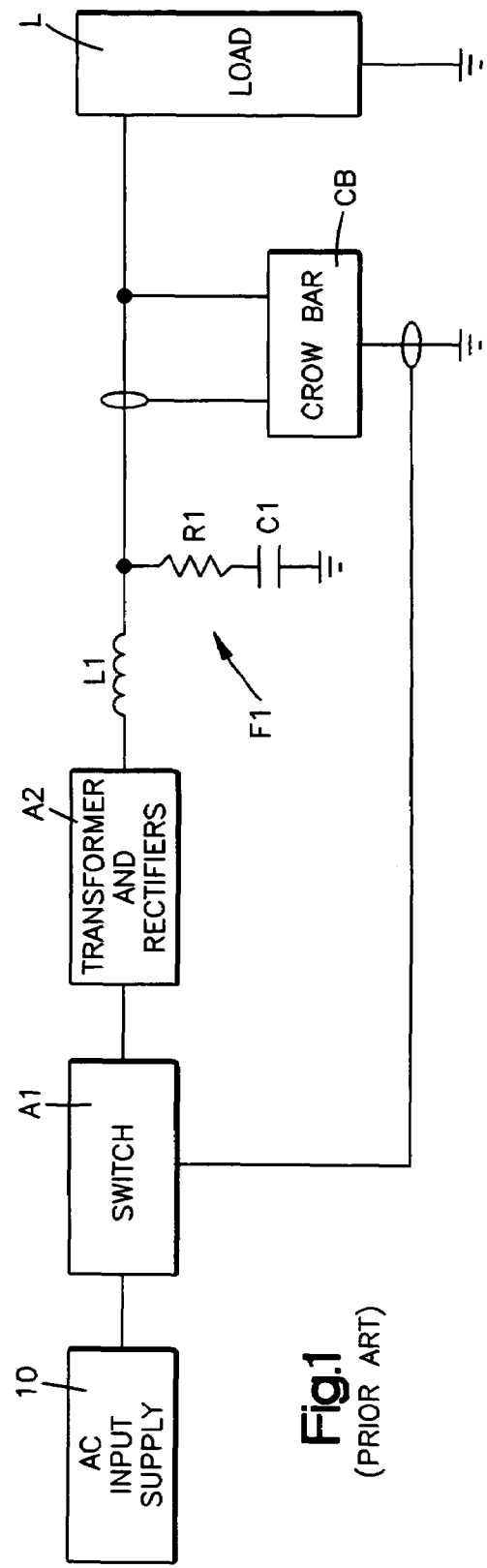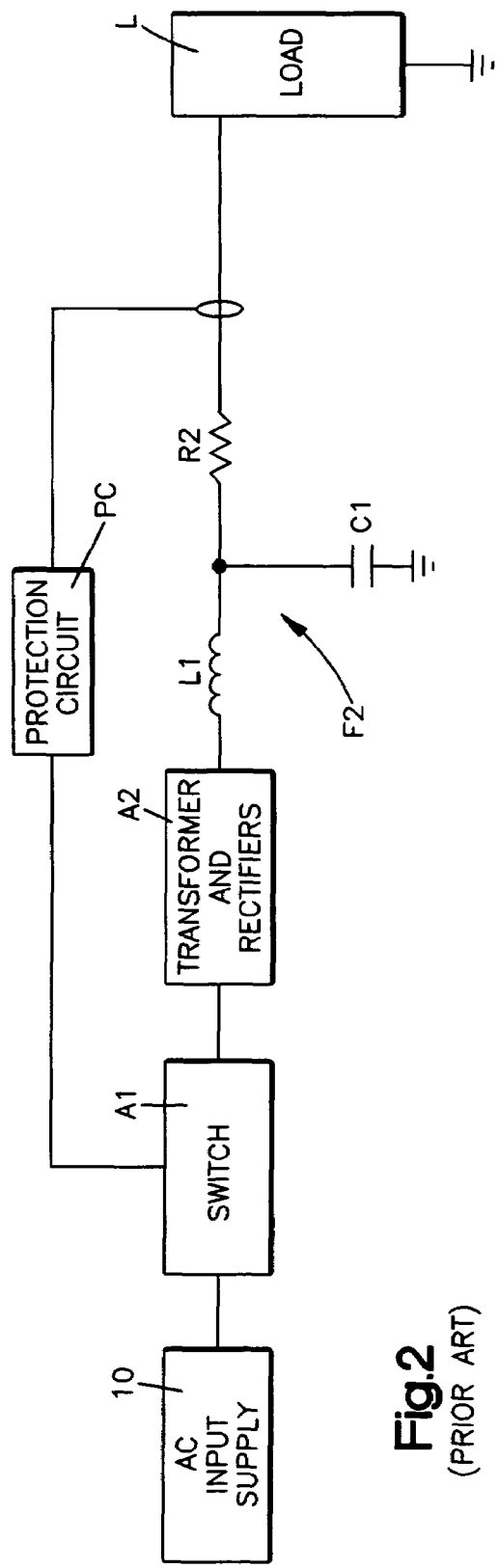
Fig.1 (PRIOR ART)
Fig.2 (PRIOR ART)

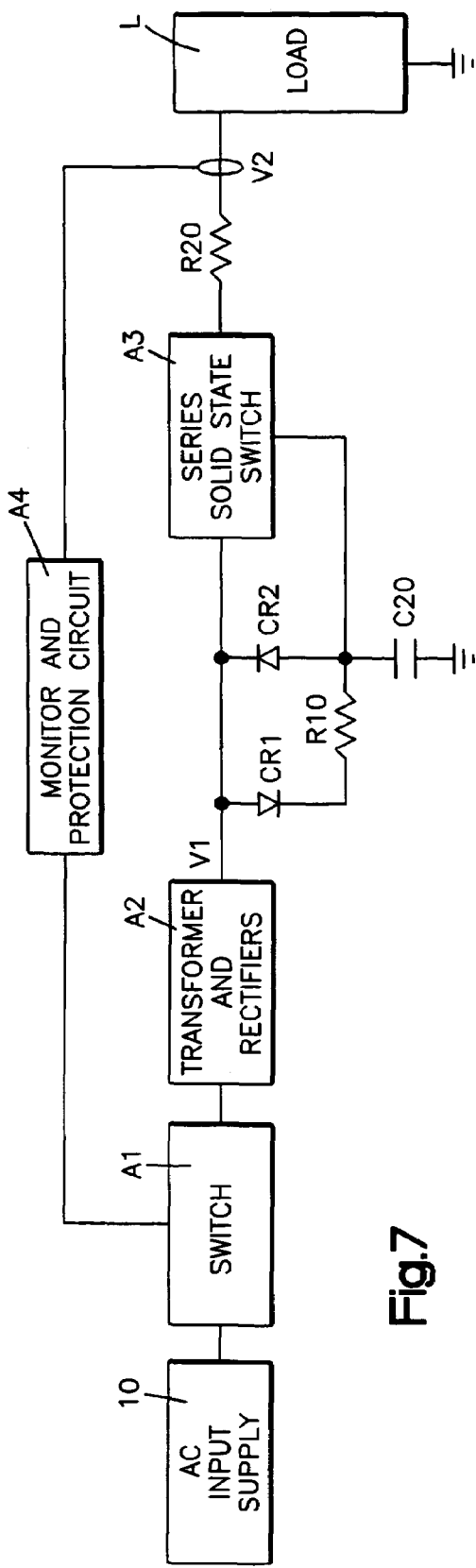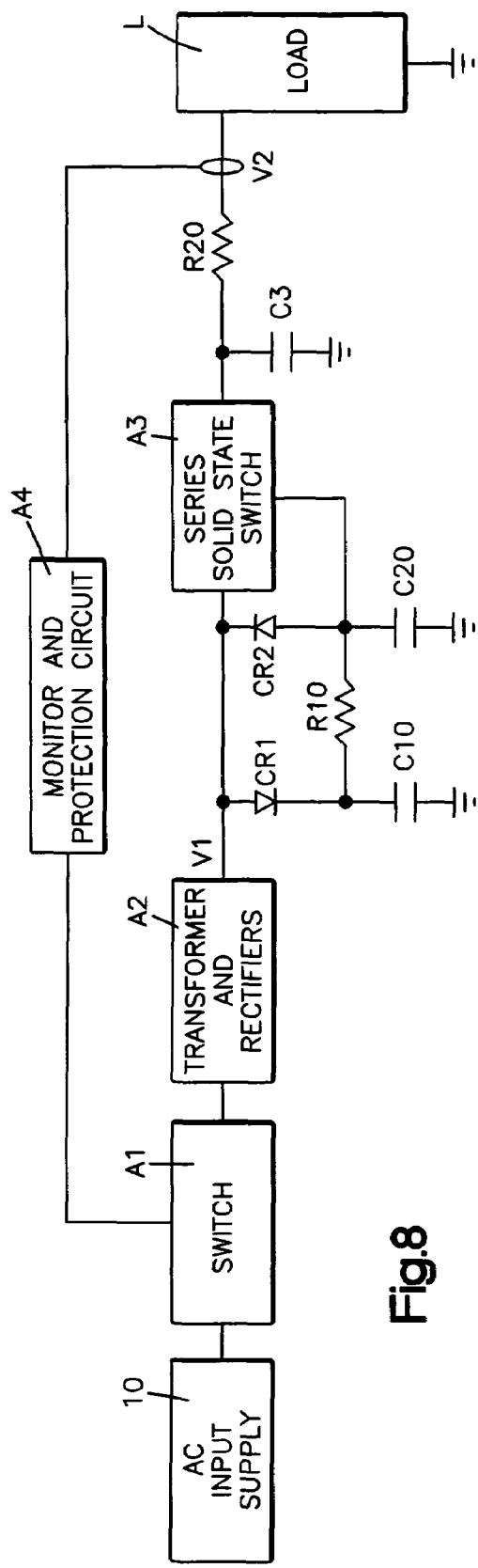

INDUCTIVE OUTPUT TUBE (IOT) CONTROL CIRCUIT

BACKGROUND OF THE INVENTION

1. Technical Field

The present invention is directed to the art of RF broadcast transmission systems and, more particularly, to improvements in controlling the linearity performance of an inductive output tube (IOT).

2. Description of the Prior Art

It is known that an inductive output tube (IOT) has particular application for use in television broadcasting wherein high kilowatt level RF power is required. An example of such an IOT is found in the U.S. Pat. No. 6,232,721 to D. Danielsons assigned to the same assignee as the invention herein and the disclosure of which is herein incorporated by reference.

Inductive Output Tubes or IOT, as they are commonly called, are high vacuum electron tubes, which allow an electron beam to travel from one end to another in a controlled way. There are four primary parts to an IOT: a cathode which emits electrons, an anode which accelerates the electrons, a collector which collects the electrons, and a grid for controlling the electron emission. The electrons are emitted from a spherical surface cathode consisting of a tungsten matrix heated from behind by a tungsten heater. A spherical pyrolytic carbon grid is positioned close to the cathode and controls the emissions of electrons from the cathode. The cathode is maintained at a relatively high potential (−35,000 volts for typical tubes) while the grid is at a relatively low potential (−50 to −250 volts for typical tubes) with respect to the cathode. If the grid is made less negative with respect to the cathode, then more electrons are emitted. The high electric field between the cathode and anode makes the emitted electrons travel toward the anode or collector. A magnetic field is used to focus the electrons into a beam. Emitted electrons are collected in the collector completing the circuit.

The Inductive Output Tube is used primarily as a high power UHF amplifier. One primary use is in UHF television transmitters operating in the frequency range of 470 MHz to 860 MHz. It is used both for analog television and digital television transmissions. In order to obtain good efficiency, the IOT is operated in a class A/B mode of operation. Due to the class A/B mode of operation, the amplifier draws current which is proportional to the modulation frequencies of the RF signal applied. For analog and digital television signals, these modulation frequencies cover the range of DC through 8 MHz and are commonly called video current.

In the construction of an IOT, the pyrolytic grid is extremely fragile. Due to the high acceleration voltages used, it is possible for the tube to arc from grid to anode. If an arc occurs, the high tension supply may destroy the grid. To overcome this problem, a crowbar or other current limiting device is placed between the IOT and the high tension supply. If an arc occurs, the crowbar directs the high tension supply current away from the IOT preventing the delicate grid from being damaged. Common crowbars use either a gas filled thyratron or a triggered spark gap. These crowbars use a controlled arc to divert the current from the high tension supply away from the IOT. Since the undesired arc in the IOT and the controlled arc in the crowbar have the same impedance, a series resistor must be placed between the crowbar and the IOT, thus forcing the high tension current through the crowbar and away from the IOT.

Reference is now made to FIG. 1 that illustrates a prior art system employing a low pass filter in conjunction with a circuit for controlling an inductive output tube (IOT). The IOT and associated circuits is located in the block that is labeled "L". The IOT employs an internal grid structure that is very fragile, as noted hereinbefore, and hence, the tube is easily damaged internally if exposed to high voltage arcing. It has been recommended that a transmitter employing an IOT should be able to protect it from damage in the event of such an internal arc. That is, the beam power must be removed from the IOT to limit the energy dissipated within it to less than about 20 joules. This may be achieved by employing the crow bar circuit (CB) shown in FIG. 1.

It has been proposed to employ a fast disconnect system that would be capable of protecting a 300 mm length of thin copper wire having a diameter on the order of 0.1143 to 0.127 mm at voltages above 5 kV. Calculations will show that the energy ($I^2T$) to fuse the wire is approximately 13.6 joules, and this is lower than the 20 joules specified in the statement noted above.

The circuit illustrated in FIG. 1 includes an AC line input voltage supply 10 that supplies an AC voltage to a transformer and rectifier circuit A2 by way of a switch A1. The transformer and rectifier circuit A2 provides a six pulse rectified supply. The ripple voltage may be on the order of −27.5 dB. If the ripple voltage is to be held to a level less than −60 dB, then an additional −32.5 dB of ripple attenuation is needed from the low pass filter F1 which is comprised of inductor L1 and resistor R1 in series with capacitor C1 to ground. This filter is somewhat bulky and stores a significant amount of energy. For example, a typical value for the capacitor C1 is on the order of 8 uF. This capacitor alone at 36 kV has a storage energy on the order of 5,200 joules which is significantly more than what the load device can handle during an internal arcing event.

The filter F1 uses a low pass filter to remove the AC hum and ripple frequency of the linear power supply provided by the transformer and rectifier circuit A2. The lower bandwidth filter provides more ripple rejection and, in turn, more stored energy.

The crowbar circuit CB is a high speed switch that connects the high voltage terminal to ground potential in the event of an internal arc in the load device L. The crowbar circuit is triggered and shorts the high voltage power supply to ground potential. This allows the energy to be dissipated in the circuit path of the crow bar circuit CB instead of the inductive output tube (IOT) load L. While the crowbar circuit is enabled, the input switch A1 is switched off to remove AC power to the transformer and rectifier A2.

Reference is now made to FIG. 2 which illustrates another prior art circuit for controlling and protecting an IOT located in a load L. Since FIGS. 1 and 2 are very similar, like components in both figures are identified with like character references and only the difference are described below in detail. FIG. 2 includes smaller output filter network which includes inductor L1, capacitor C1 and a resistor R2. The energy stored in this filter is optimized so as not to exceed the manufactured recommended level before internal damage to the IOT can take place. This filter has lower energy storage than that in FIG. 1. Because FIG. 2 employs a small, low pass filter, the crow bar circuit of FIG. 1 is removed.

A disadvantage of using a low storage filter configuration as shown in FIG. 2 is that more ripple voltage is evident and performance of the system will be compromised by the residue ripple on the power supply. The low pass filter system is sufficient for a DTV (digital television) signal. The DTV signal has a lower signal to noise (SNR) ripple requirement from the high voltage power supply. This is good for the DTV signal because the residue ripple is not adequate for the traditional analog television transmitter, wherein the analog television transmitter needs a ripple voltage around 60 dB.

In the circuit of FIG. 2, the series resistor R2 provides a current limiting function. If a short circuit is detected by a protection circuit PC, a trigger signal is sent to the switch A1 to open the switch and remove the supply 10.

It is to be noted that in the prior art of FIGS. 1 and 2, low pass filter F1 or F2 is employed. These are relatively large and expensive components. The present invention contemplates achieving control of an IOT in the load 12 without employing such low pass filters. The control is directed toward minimizing the AC ripple voltage by obtaining a smooth DC voltage and without employing a large low pass filter. FIGS. 1 and 2 of the prior art are shown as FIGS. 1 and 2 in the U.S. patent to A. B. See et al. 6,724,153.

SUMMARY OF THE INVENTION

The present invention contemplates the provision of an IOT amplifier system that receives an RF input signal and provides an amplified RF output signal therefrom. In accordance with the present invention, there is provided a power supply for an RF transmitting tube while protecting the tube from a high voltage arc event. The supply includes a rectifier circuit that is configured to be connected to an AC voltage supply and has an output circuit that supplies a DC voltage to a load including such a tube and wherein the AC voltage supply may have a ripple voltage thereon. A control circuit is located intermediate the output circuit and the load for purposes of reducing any ripple voltage thereon. This control circuit includes a series solid state switch that is connected in series between the rectifier circuit and the load. The control circuit also includes a reference capacitor that is coupled between the output circuit and the load for purposes of supplying a reference voltage to the switch. Whenever the voltage from the output circuit of the supply is greater than the reference voltage then this is clipped so as to reduce that which is supplied to the load.

BRIEF DESCRIPTION OF THE DRAWINGS

The foregoing and other advantages of the invention will become more apparent to one skilled in the art to which the present invention relates upon consideration of the following description of the invention with reference to the accompanying drawings, wherein:

FIG. 1 is a schematic-block diagram of prior art useful in explaining the background of the present invention;

FIG. 2 is also a schematic-block diagram illustration of another prior art useful in explaining the background of the present invention;

FIG. 7 is a schematic-block diagram illustration of another embodiment of the invention herein;

FIG. 8 is a schematic-block diagram illustration of a still further embodiment of the invention herein;

DESCRIPTION OF THE PREFERRED EMBODIMENTS

Figure 3:
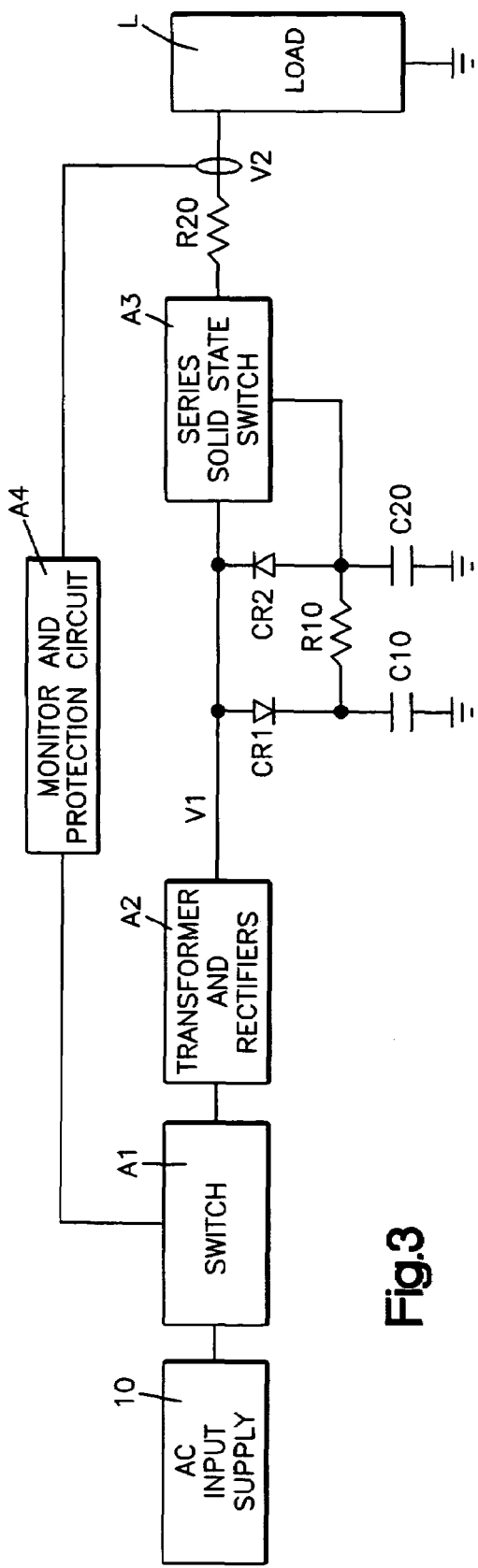
FIG. 3 is a schematic-block diagram illustration of an embodiment of the invention herein.

Reference is now made to FIG. 3 which illustrates one embodiment of the present invention. It is to be noted that like components in FIG. 3 with respect to FIGS. 1 and 2 are identified with like character references to facilitate the description herein.

It is to be noted from an inspection of FIG. 3 that the transformer and rectifier circuit A2 is not provided in its output circuit with a low pass filter as in the case of filters F1 and F2 in FIGS. 1 and 2. It is also to be noted that this circuit does not employ a crow bar circuit. Instead, this embodiment of the invention employs an active series switch A3 located in the output circuit of the transformer and rectifier circuit A2 for purposes of removing the inherent ripple on a simple rectified linear power supply provided by the AC input supply source 10 in conjunction with the rectifier circuit A2. A typical six pulse rectified AC power supply as provided herein has an inherent ripple on the order of −27.5 dB and a 12 pulse rectified power supply has a typical ripple on the order of −39 dB. A low ripple high voltage power supply is obtained herein by clipping off the ripple voltage riding on top of the DC power supply with the use of a peak detector which includes diode CR1 and capacitor C10.

The purpose of the series solid state switch A3 is to reference minimum voltage of the input. If the input voltage is higher than the minimum reference, the output is maintained constant and the ripple voltage will be impeded by the switch. Therefore, the output will be a smooth DC voltage and the AC ripple voltage of less than −60 dB is achievable without using a large, low pass filter. This high voltage power supply (HVPS) can be used for both DTV and traditional analog television transmitters.

The diode CR1 and the capacitor C10 form a peak detector which also provides the needed bias current for diode CR2 and capacitor C20. The output ripple is controlled by the low pass filter set by resistor R10 and capacitor C20. If the time constant of this filter is longer, the output ripple voltage will be smaller.

As in the prior art, the unfiltered DC power supply includes a transformer and rectifier circuit A2 that produces a raw DC voltage with a ripple frequency at a multiple of the AC line frequency. This may be better appreciated by reference to the depiction of this in FIG. 10 which illustrates ripple voltage with respect to time. This ripple voltage needs to be reduced to a level that is suitable to drive the load L. The prior art technique has been to smooth out this ripple by using a low pass filter, such as filters F1 and F2 in FIGS. 1 and 2. The function of the inductor and capacitor is to provide a low pass filter that limits the ripple component going to the load L. A low band width will achieve a better ripple reduction.

A switch A1 serves as a disconnect switch and is sufficiently fast to disconnect and interrupt the input AC supply to the transformer and rectifier circuit A2. The required speed is determined by the circuit components and the total energy to the load device.

The solid state switch A3 is a series solid state switch that consists of a single transistor or a series of transistors for higher breakdown voltage. Standard transient protection circuits are used to protect each transistor in the event of any transient condition.

A monitor and protection circuit A4 detects any short circuit in the load L and generates a turn-off command to the input switch A1. The disconnect of the input switch is quick in order to interrupt the input AC voltage to make sure that the total energy does not exceed 13.6 joules, the lower of the two limits.

The transformer employed in the transformer and rectifier circuit A2 has a typical series loss of approximately 3%. Thus, a short circuit current is increased by 33 times. If the normal operation of the load device current is 3 amps at 36 Kv, then the short circuit current will be on the order 100 A. The source resistance ($R_t$) of the transformer is on the order of 360 ohms. If the resistor R20 is greater than 0 ohm, then the short circuit current will be less. The short circuit current $I_S$ is defined as $$I_s = \frac{V}{R_t + R_{20}}.$$

The series resistor R20 adds dissipation and reduces the overall efficiency of the circuit. The benefit of resistor R20 is to lower the short circuit current and provide a longer time before the interruption to the AC input voltage is needed. The relationship of energy (E) and time (t) is simply defined as:

$$t = \frac{E}{I_s^2}.$$

In this formula, E represents the total energy delivered. For example, assuming the loss in the transformer is 3% at 3 A and 36 KV, and that the resistor R20=0. The short circuit current is 100 A. Consequently, t (time) is equal to 0.00136 seconds. This is the time needed to interrupt the input AC voltage before the total energy exceeds 13.6 joules.

In another example, assume all the conditions as described above, except that resistor R20 is equal to 150 ohms. The short circuit current is 70.6 A. Consequently, t=0.0027 seconds. The time is doubled by adding a resistor in series.

Figure 10:
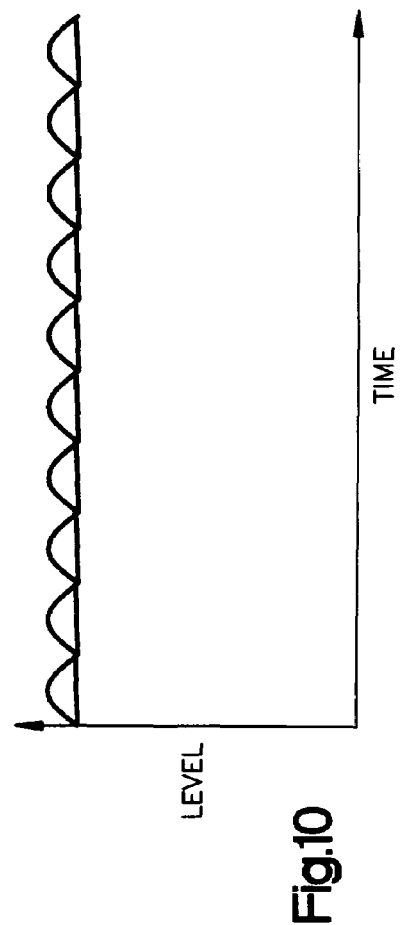
FIG. 10 is a schematic illustration showing ripple voltage with reference to time is useful in explaining the invention herein.

With reference to FIG. 10, it is to be noted that the ripple voltage is reduced by the series solid state switch without using a large low pass filter. The output ripple level is set by the bias reference voltage as determined by resistor R10 and capacitor C10.

Figure 4:
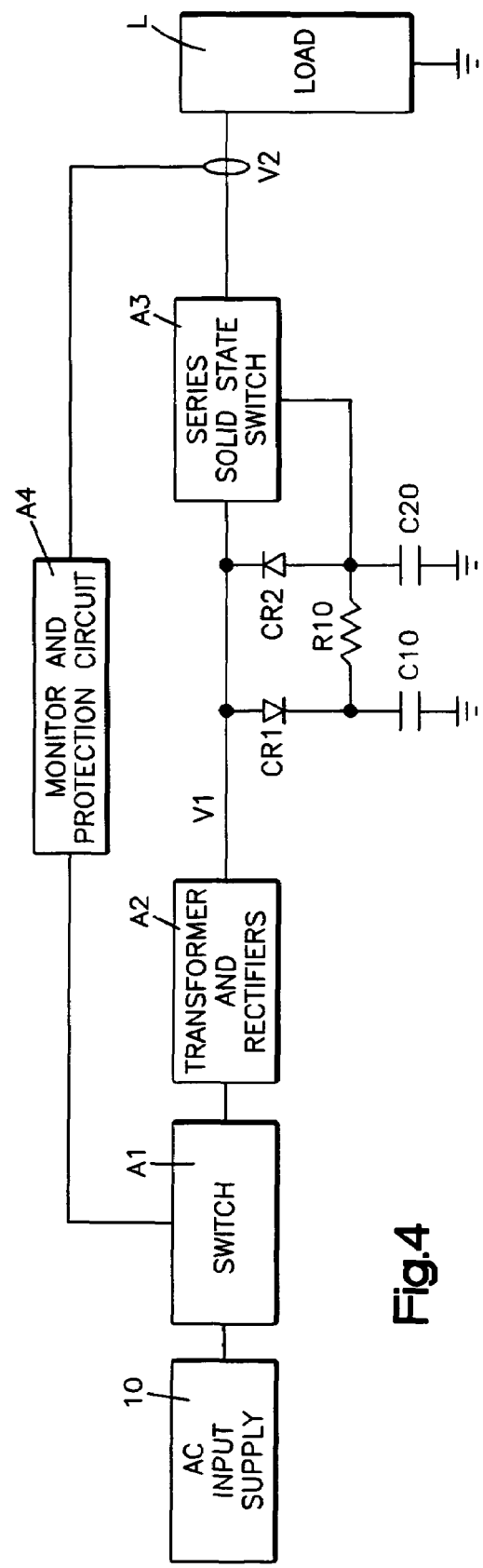
FIG. 4 is a schematic-block diagram illustration of a second embodiment of the invention herein.

Reference is now made to FIG. 4 which illustrates another embodiment of the invention. This embodiment is similar to that of FIG. 3, and consequently, like components are identified with like character references and only the changes are described below. It will be noted that FIG. 4 illustrates the basic circuit configuration with the series resistor R20 of FIG. 3 removed. Consequently, the short circuit current is slightly higher, and a faster interruption to the AC input supply should be made.

Figure 5:
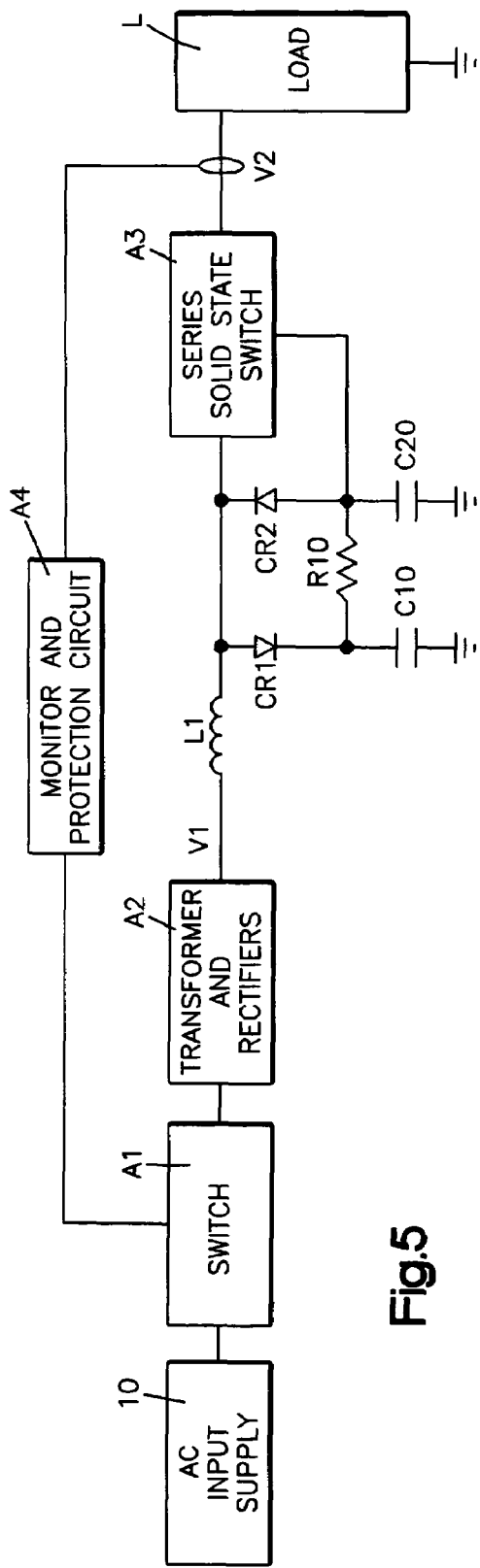
FIG. 5 is a schematic-block diagram illustration of another embodiment of the invention herein.

Reference is now made to FIG. 5 which shows another embodiment of the invention which is similar to that as illustrated in FIGS. 3 and 4, and consequently, like components are identified with like character references and only the differences will be described below. It is to be noted in FIG. 5 that no resistor R20 is provided. However, the embodiment of FIG. 5 employs an inductor L1 in the output circuit of the transformer and rectifier circuit A2. The purpose of this inductor is to provide a slower rate of change of the short circuit current to the load L. The benefit of using a series inductor is that under a short circuit condition, the short circuit current is not changing instantaneously. This allows the monitor and protection circuit A4 additional time to trigger the switch A1 and interrupt the AC input supply.

Figure 6:
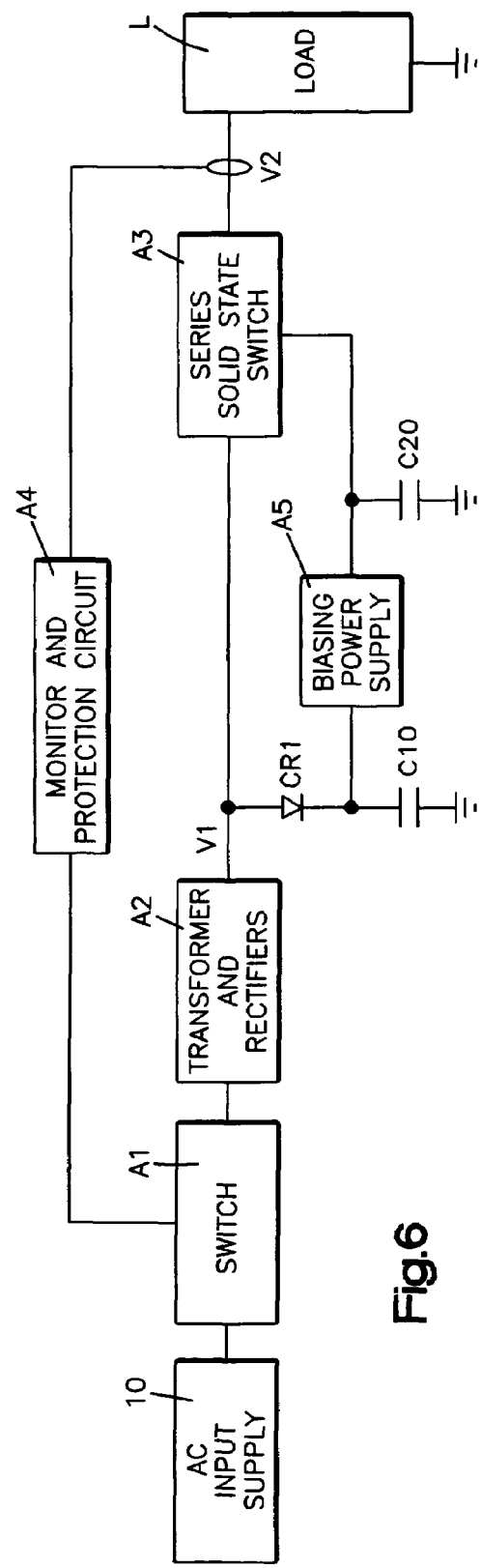
FIG. 6 is a schematic-block diagram illustration of a still further embodiment of the invention herein.

Reference is now made to FIG. 6 which illustrates a circuit configuration similar to that as described hereinabove with reference to FIGS. 3-5 and wherein like components are identified with like character references and only the differences are be described herein with reference to FIG. 6. As shown in FIG. 6, the resistor R10, diode CR2 and inductor L1 have been removed. A biasing power supply A5 has been added to provide a negative bias voltage reference to the voltage and the capacitor C10. Diode CR1 and capacitor C10 form a positive peak detector with reference to the peak of the ripple voltage. Voltage at capacitor C20 is equal to the peak detected voltage on capacitor C10 minus the biasing power supply. Consequently, the output is equal to the reference voltage on capacitor C20.

Reference is now made to FIG. 7 which illustrates an embodiment similar to that of FIG. 5, with the exception that capacitor C10 has been removed and that resistor R20 has been added.

Reference is now made to FIG. 8, which illustrates an embodiment similar to that of FIG. 7 with like components being identified with like character references and only the differences being described below. In this figure it will be noted that capacitor C10 has been added and that a high frequency decoupling capacitor C3 has been added. The value of capacitor C3 is small and only filters higher frequency ripples and not for purposes of reducing AC from noise. The energy in capacitor C10 is negligible in comparison to the total energy of the short circuit event.

Figure 9:
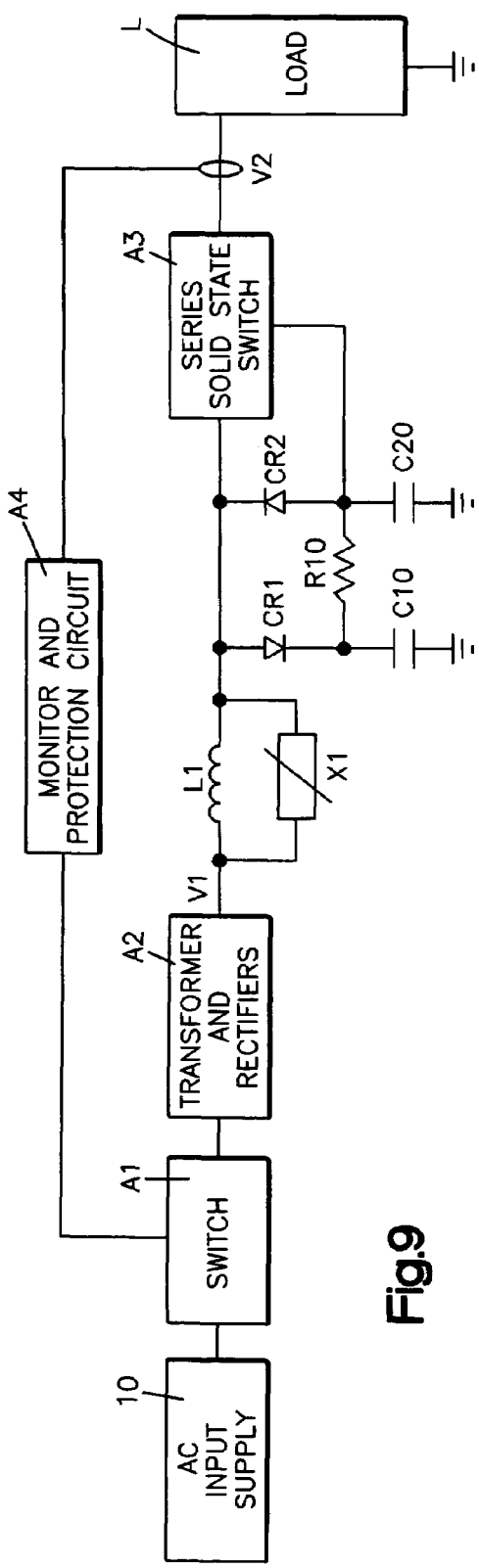
FIG. 9 is a schematic illustration of another embodiment of the invention herein.

Reference is now made to FIG. 9 which illustrates an embodiment similar to that of FIG. 5 with like components being identified with like character references and only the differences being described below. This embodiment includes a MOV transient suppression device X1 located in parallel with inductor L1. Under normal operating conditions, the breakdown voltage of the MOV is much higher than the ripple voltage across the inductor L1. Therefore, X1 is not affecting the normal function of the circuit. Under a short circuit condition at the load device, the voltage across inductor L1 is limited by the breakdown voltage of X1 and the majority of the current flow will be going through X1. Since X1 is a transient suppression device and is also a dissipative device, this will offer two benefits to the circuit, including limiting the short current and dissipating energy while current is flowing through X1 during a short circuit condition.

Although the foregoing has been described in conjunction with the preferred embodiment, it is to be appreciated that various modifications may be made without departing from the spirit and scope of the invention as defined by the appended claims.

Having described the invention, I claim the following:

1. A power supply for an RF transmitting tube while protecting the tube from a high voltage arc event, said supply comprising:
   a rectifier circuit configured to be connected to an AC voltage supply and having an output circuit that supplies a DC voltage to a load including a said tube and wherein the DC voltage may have a ripple voltage thereon;

a control circuit located intermediate said output circuit and said load for reducing any said ripple voltage, said control circuit including a series solid state switch that is connected in series between said rectifier circuit and said load, said control circuit also including a reference capacitor coupled to said output circuit and to said load for supplying a reference voltage to said switch so that a voltage at said output circuit that exceeds said reference voltage will be clipped to reduce the voltage that is applied to said load.

2. A power supply for an RF transmitting tube while protecting the tube from a high voltage arc event, said supply comprising:

a rectifier circuit configured to be connected to an AC voltage supply and having an output circuit that supplies a DC voltage to a load including a said tube and wherein the DC voltage may have a ripple voltage thereon;

a control circuit located intermediate said output circuit and said load for reducing any said ripple voltage, said control circuit including a series solid state switch that is connected in series between said rectifier circuit and said load, said control circuit also including a reference capacitor coupled to said output circuit and to said load for supplying a reference voltage to said switch so that a voltage at said output circuit that exceeds said reference voltage will be clipped to reduce the voltage that is applied to said load wherein said control circuit includes a diode connected in series with said reference capacitor across said output circuit.

3. A supply as set forth in claim 2 wherein a second capacitor and a first resistor are connected in parallel with said reference capacitor.

4. A supply as set forth in claim 3 wherein said second capacitor and a second diode are connected together in a series circuit that is across said output circuit.

5. A supply as set forth in claim 4 including a second resistor connected in series from said solid state switch to said load.

6. A supply as set forth in claim 4 wherein an inductor is connected between said output circuit and said second diode.

7. A supply as set forth in claim 2 wherein a second capacitor and a biasing power supply are connected in parallel with said reference capacitor.

8. A supply as set forth in claim 2 including a second diode and a first resistor connected in series with said reference capacitor across said output circuit.

9. A supply as set forth in claim 5 including a third capacitor connected between said switch and said load.

10. A supply as set forth in claim 9 including a third resistor connected between said third capacitor and said load.

11. A supply as set forth in claim 6 including a transient suppression device connected in parallel with said inductor.

* * * * *